Dec. 15, 1959 A. CLAUD-MANTLE 2,916,901
BOX LID FASTENER
Filed Sept. 25, 1956 2 Sheets-Sheet 1

INVENTOR
A. Claud-Mantle
BY
ATTORNEYS

Dec. 15, 1959   A. CLAUD-MANTLE   2,916,901
BOX LID FASTENER
Filed Sept. 25, 1956   2 Sheets-Sheet 2
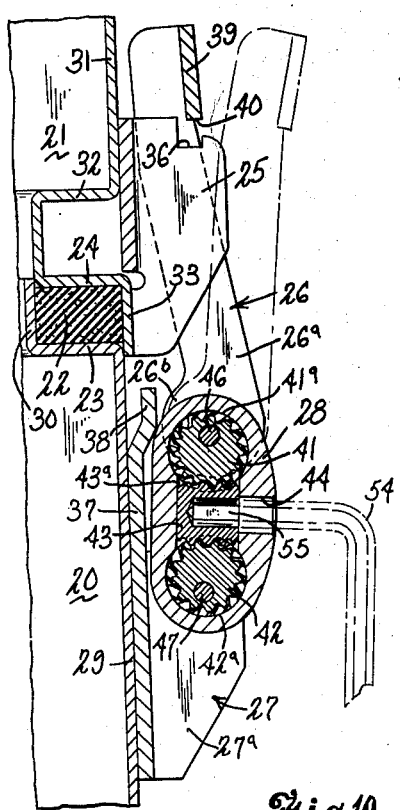
Fig. 5.
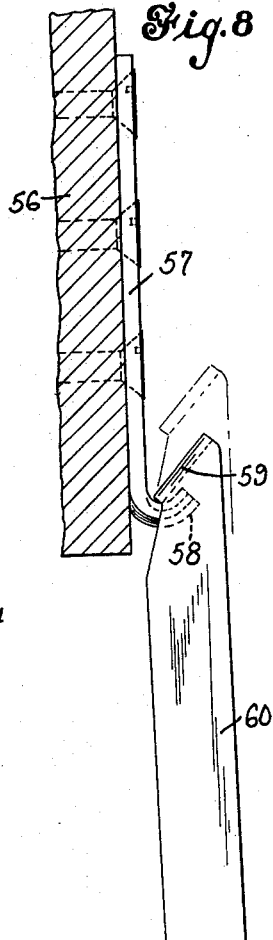
Fig. 8.
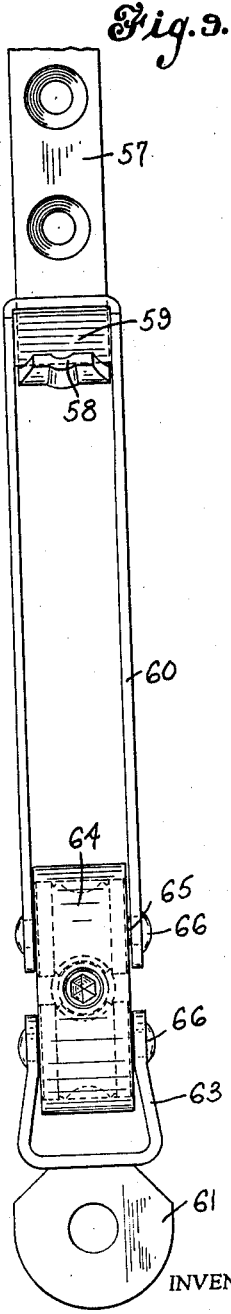
Fig. 9.
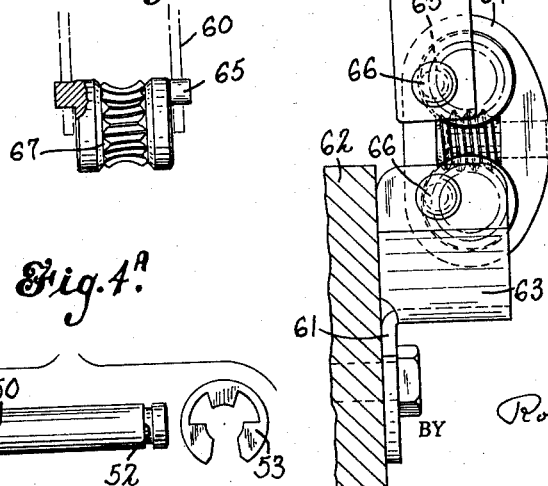
Fig. 10.
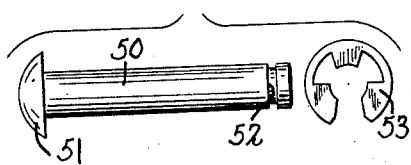
Fig. 4ᴬ.
INVENTOR
A. Claud-Mantle
BY Rockwell A. Bartholow
ATTORNEYS

United States Patent Office 2,916,901
Patented Dec. 15, 1959

2,916,901

BOX LID FASTENER

Arthur Claud-Mantle, Trumbull, Conn., assignor to The Bassick Company, Bridgeport, Conn., a corporation of Connecticut Application September 25, 1956, Serial No. 611,826

7 Claims. (Cl. 70—76)

This invention relates to a closure means for boxes and like containers used for carrying, shipping and storing articles that require protection from the effects of air, vapor, liquid and the like.

The invention relates especially to a fastener used with a container where an air-tight seal is to be provided between the lower container section or box body and the upper section or lid, the sealing effect being achieved by the compression of one or more gasket member interposed between the body and the lid.

One of the objects of the present invention is to provide an effective fastener for this type of container by which the contents of the container are better protected than has been possible heretofore.

Another object is to make it possible to bring about the requisite compression of the gasket means employed for the purposes mentioned above.

A further purpose is to provide improved means for controlling or limiting the pressure applied to the gasket means for the sealing of the container.

It is also a purpose of the invention to provide a fastener of relatively simple form which can be conveniently operated for locking the box and releasing the lid from the box body and in which in the closed position of the box the latter, even if subjected to rough handling and other adverse conditions, will not have its protective seal impaired.

A further aim of the invention is to provide an improved form of fastener that is well adapted to the uses above mentioned and a number of others.

In the accompanying drawings:

Fig. 4A shows a modified form of member for securing the lower worm wheel to the base or lower bracket;

Fig. 5 is a view similar to Fig. 3, showing the fastener in the released position;

Fig. 8 is a side elevation, partly in section, of a modified form of fastener, showing the fastener in the closed position;

Fig. 9 is a face view of the fastener; and

Fig. 10 is a detail view of one of the worm wheels used in this form.

Figure 7:
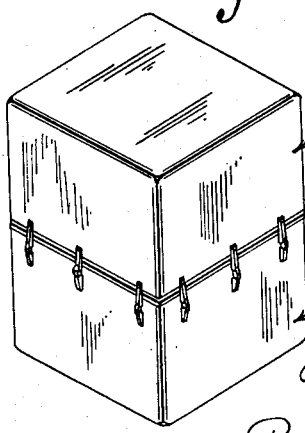
Fig. 7 is a perspective view of a box equipped with fasteners of the kind shown in the preceding views.
Figure 6:
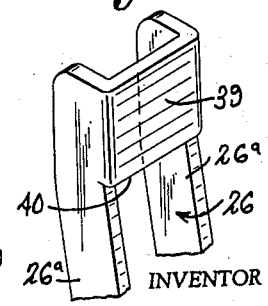
Fig. 6 is a fragmentary view of the upper end of the swinging hook member.

For the protection of scientific instruments, aircraft parts, and other parts or apparatus requiring protection from moisture, liquid, vapor and corrosion, as well as protection from rough handling, vibration and shock, containers made of metal, fiber glass or other suitable material have been used, and fasteners have been employed with such containers which are adapted to exert pressure on gaskets or like sealing members. However, the closure means for such boxes or containers have been open to certain objections which it is an object of this invention to overcome. A typical container of this general class is shown in Fig. 7, and in this case the box has a lid which is relatively deep so that it is similar in form to the box body or lower section. This container is shown merely by way of example, and by way of example the drawing shows the container equipped at each of the four faces with three fasteners embodying the invention. Between the box body and lid an elastic gasket member is interposed which is placed under compression when and as the fasteners are placed in the closed or locking position.

In this particular form a flat, elastic gasket member, which may be a continuous member extending around the box, rests on a shouldered portion provided on the wall of the metal box body, and the metal box lid is equipped with a compressing portion adapted to contact the upper face of the gasket. The fastener comprises a lower bracket portion or base member which in this form is fixed to the box body at the exterior thereof, and it further comprises a member in the nature of a bracket or keeper applied to the upper section or lid at the exterior thereof. A laterally swingable hook member has a pivotally mounted lower end through which it is connected indirectly to the lower bracket member or base, and the upper end of the hook is adapted to cooperate with the upper bracket member in closing and releasing the lid. Between the lower end of the hook and the upper part of the lower bracket or base is placed a gear housing containing gear means for effecting engagement and release of the separate box parts as hereinafter described.

In the drawings the box body or lower section is indicated at 20, the lid or upper section at 21, the gasket (which may extend continuously around the box) at 22, the lower gasket-supporting shoulder at 23, the upper gasket-compressing portion at 24, the bracket carried by the lid at 25, the laterally swingable hook member at 26, the lower bracket member or base carried by the box body at 27, and the gear housing at 28.

Figure 1:
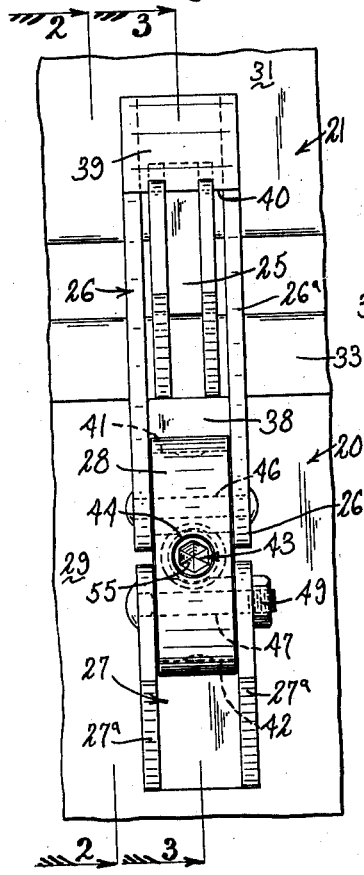
Fig. 1 is a face view of a portion of a box equipped with a sealing device or fastener embodying the invention, the fastener being in the closed or sealing position.
Figure 2:
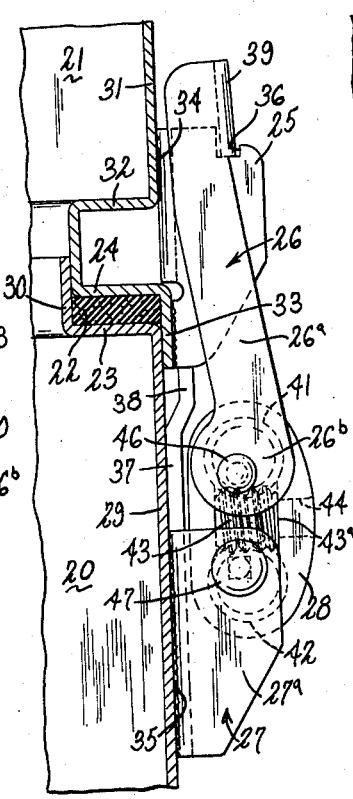
Fig. 2 is a section on line 2—2 of Fig. 1.

The box body in this form has an upright metallic wall 29, and the shoulder 23 is in one piece with this wall and extends inwardly therefrom, as shown in Fig. 2, and from the shoulder 23 a short lip 30 is extended upwardly so as to provide walls supporting the gasket 22 along its lower and inner surfaces. The upper section or lid 21 has an upright wall 31 which is formed to present an inwardly extending, substantially rectangular part or shoulder 32 presenting a channel at the face of the box and providing two horizontal portions and an inner vertical portion. The vertical portion fits over the lip portion or extension 30 of the box body, and the channeled inwardly extending part or abutment thus constructed provides faces enclosing the gasket along the upper and outer faces thereof inasmuch as a downward flange or extension 33 is provided on this part to enclose the just-mentioned gasket faces, with a portion of this downward extension adapted to slide over the outer box face in moving the parts into the position shown in Fig. 2. By this construction the gasket can be enclosed and supported and the lid portion of the box can be guided into place by the upwardly extending inner lip on the body portion and by the downwardly extending outer portion 33.

The upper bracket member 25 is made of sheet metal and is bent up to present a U-shape in horizontal section, the same having walls parallel to each other and extending laterally from the box structure, this bracket member being rigidly fixed to the lid member. The connection between the bracket member and the lid member is preferably effected by welding, a portion of the back wall of the bracket member being welded to the lid above the above-mentioned channel portion thereof, as indicated at 34, and another part of the bracket being welded to the lid member at a point below the channel, as indicated at 35.

Figure 3:
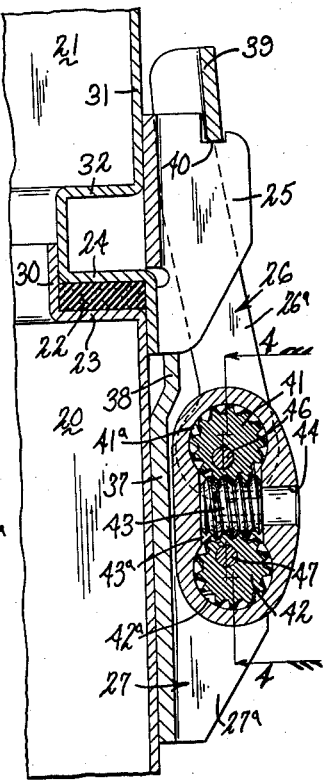
Fig. 3 is a section on line 3—3 of Fig. 1.

The preferred shape of the furcations or side walls of the bracket 25 is as shown in Fig. 3, these side walls each being provided near the upper extremity with a notch 36 which cooperates with the swingable hook member 26 in the manner hereinafter described.

The lower bracket member or base member 27 is similar to the bracket member 25 in that it is of U-shaped cross section with laterally and outwardly extending side walls 27a. Integral with this last-mentioned bracket at the inner or connecting portion of the U is an upward extension 37 in the nature of a plate which, through a portion of its height, lies in contact with the wall of the box body. At its upper end this extension is bent laterally away from the box wall to provide an offset part 38. This part 38 extends under portions of the side walls of the upper bracket 25, and thus there is provided a stop which can limit the downward movement of the box lid when it is placed over the box body. The swingable lever 26 in this form is made of sheet metal having two parallel side portions 26a that are spaced from each other and are interconnected at the upper end of this hook member by an integral connecting portion 39, said connecting portion being located at the outer part or face of the lever at the upper end of the lever and presenting at the lower edge of the part 39 an edge 40 adapted to be received in the notches 36 of the upper bracket.

The gear housing 28 previously mentioned is adapted to be connected by means of gear members with the lower end portion of the lever 26 and the upper part of the body portion of the base or bracket 27. Within this gear housing is an upper worm gear 41 and a lower worm gear 42, these gears being rotatable by a worm 43 located between them. The gears 41 and 42 rotate in a plane that is parallel to the side wall of the box body, and the worm 43 rotates in a plane which is perpendicular to the wall of the box body and has an axis at right angles to the plane of the worm wheel axes. The worm 43 is accessible by way of an opening 44 in the outer face of the housing 28 so that it may be turned by insertion and rotation of a suitable key wrench.

Figure 4:
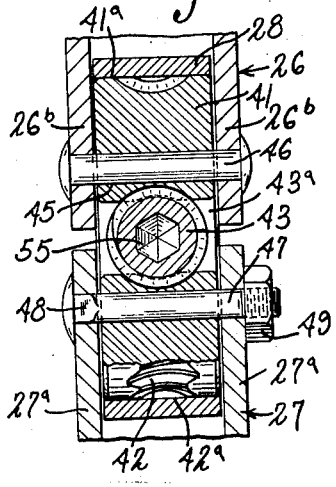
Fig. 4 is a section on line 4—4 of Fig. 3.

The worm gears 41 and 42 are received in upper and lower bores 41a and 42a extending through the housing 28 from side to side, and the worm 43 is received and operates in a narrower connecting chambered portion 43a of the housing located between the above-mentioned bores and communicating with the opening 44. The upper gear 41 has an eccentric bore 45 extending through it from side to side, and rotatably mounted in the bore is a pivot pin 46, the ends of which extend through the lower parts of the side walls or members 26a of member 26, the ends of these pins being riveted over, as shown in Fig. 4, to provide on the gear 41 an eccentric connection to the swingable lever member 26. A similar connection exists between the lower gear 42 and the body portion of bracket 27 although in the form shown in Fig. 4 a pin 47 is employed having a square shouldered head 48 at one end and a threaded nut 49 at the other end. Fig. 4A shows a modification of the arrangement just described. In Fig. 4A the pin 50 has a rivet-shaped head 51 at one end and is provided with an annular groove 52 near the opposite end. A laterally slidable collar 53 may be engaged with the groove 52 to maintain the pin 50 in the assembled position.

As is apparent from Fig. 2, the lower ends of the duplex hook member are enlarged and rounded, as shown at 26b, and extend over the open sides of the gear housing so as to enclose the gear 41. The worm 43 is in an enclosed portion or chamber in the housing open at the forward face of the housing where the opening 44 is provided, this opening being of less diameter than the worm and the arrangement being such that, when the worm is placed in its working chamber or space, it is held against endwise movement relatively to the housing owing to the fact that the worm has end faces abutting the inner surfaces of the housing, as shown in Figs. 3 and 5. After the pin 46 has been placed through the upper gear and through the swinging lever, the ends of the pin are riveted over to provide a permanent connection of the gear to the lever.

When the parts are in the position shown in Figs. 2 and 3 the eccentrically mounted pins in the worm gears are relatively close to each other, and the catch lever is held in a lowered position in which its hook is held in locking engagement with the notched upper bracket or keeper member 25. In this position the lever body is sloped slightly in an upward and leftward direction (Fig. 2) so that its upper end is quite close to but out of contact with the wall of the lid. Release of the fastener is effected by inserting a key wrench 54 into the worm, as shown by the dotted lines in Fig. 5, and rotating the worm. The worm has a hexagonal socket 55 into which the wrench passes after moving through the opening 44. The wrench is turned to rotate the worm and worm gears and move the eccentrically mounted pins to the releasing position shown in Fig. 5. This action causes the gear housing to be lifted as a result of the rotation of the lower gear and the catch lever to be moved upwardly relatively to the housing as a result of the rotation of the upper gear. When the catch lever or swinging bolt is thus raised to the position shown in full lines in Fig. 5, it may be grasped at its upper end to move it pivotally to the broken-line position shown in Fig. 5. In this latter position the hooked end of the catch lever is out of the path of the upper bracket, and the lid, when the various fasteners have been so manipulated, can be lifted off the body.

It is important to note that when the parts are moved from the releasing position shown in Fig. 5 to the fastening and sealing position shown in Fig. 2 the upper bracket will be brought down to a position in which its lower edge will engage the stop part or lug 38 forming a part of the lower bracket. After this occurs, it will be impossible to move the lid farther, the result being that in locking the lid in position the gasket will be subjected to a predetermined degree of compression. Thus there is provided a positive control of the extent of compression of a gasket of a prescribed size suitable to the existing conditions and, while the several fasteners employed on the box will be spaced apart, there will be provision for maintaining a substantially uniform and effective compression of the gasket throughout the gasket (sealing) area.

The sides of the housing 28 are of upwardly elongated approximately elliptical shape and it has a planar rear face that merges into rounded upper and lower end portions, the latter merging into a somewhat domed or crowned front face. The upper and lower bores in which the worm wheels are received and to which the worm wheels conform extend through the housing from side to side and are interconnected by the chamber portion 43a, which extends from side to side of the housing so as to be open at both side faces. The worm 43 has a length less than the diameter of the worm wheels so as to fit within the worm space and abut the surfaces of the forward and rear walls of the housing. In assembling the gearing in the housing, the two worm wheels with the interposed worm can be placed in the housing as a unit by movement of such unit into the housing from one side, so that the side faces of the upper and lower wheels will be substantially flush with the adjacent side faces of the housing. The pins 46 and 47 can then be placed in position in the wheels and fastened in place relatively to the base or mounting member and the fastening lever, as described above.

The teeth of the worm wheels may be cut in substantially cylindrical steel blanks, and in the form which has just been described these teeth extend over only a part of the blank width, leaving plain cylindrical shoulders at the side portions of the gear. The holes for the fastening pins should in each case be in line with the center of the gear and one of the gear teeth. For obtaining a smoothly working gearing, the gears may have a plating of cadmium, and this will also prevent corrosion. Cold rolled steel may be used for making the gear blank. The worm is preferably made of steel and hardened, and is also plated with cadmium. The socket in the worm into which the key wrench can be introduced is of hexagonal shape and extends through a substantial portion of the worm length.

By making the upper and lower brackets of the shape above described, with flanges extending outwardly from the box wall and with bodies welded to the respective box parts, the box structure upon which the fastening parts are mounted is made very strong and durable, and even when the box or container is subject to very rough usage there will not ordinarily be any bending, denting, or like injury to the box when it has been loaded and closed. In this form the fastener is applied to the box exteriorly, but in some cases it may be applied interiorly. Where the fastening means is of the kind described, the metal container may be reused so as to remain in service for a long period.

In the form which has just been described, the pin means, comprising a nut 49 attaching the lower gear wheel to the base bracket, provides for detachment of the gear housing from said bracket and hence said bracket may be attached separately to its supporting wall, which is a matter of convenience in installing the fastener structure, the gear housing and its connected parts being attached to the bracket as a later step. These same conditions obtain when the alternate form of assembling pin, shown in Fig. 4A, is used.

It is understood from what has been said that, when the box is in the closed and sealed condition shown in Fig. 2, upward pulling or pushing effort exerted on the upper section or lid is substantially in the direction in which the fastening lever 26 is disposed and enjoys no mechanical advantage, and that on the other hand the worm gearing resisting unlocking or opening movement has a large mechanical advantage. As a result, the fastener provides maintenance of most secure closing and sealing of the container.

It has been brought out above that, on rotation of the worm by the key wrench, one of the worm wheels engaging the worm can be rotated to move in a locking or unlocking direction a fastening member having eccentric and pivotal connection to the worm wheel.

In Figs. 8, 9 and 10 there is shown a modification of the fastener structure. Here, as in the first form, the worm causes actuation of a swingable fastening member, but the device is used as a fastening means for fastening an upwardly liftable member relatively to a lower member in the nature of a stationary frame. Such a structure can be employed, for example, for locking a boat in fixed position on a trailer, one member of the fastener being attached to the transom of the boat and the other attached to the transverse member of a suitable cradle.

In this form a portion of the transom is indicated at 56, and this has attached to it an upper bracket 57 in the form of a plate having an outstanding lug 58 at the lower end. This lug 58 is adapted to be engaged by a hook 59 at the upper end of a swinging fastening lever 60 corresponding generally to the previously described lever 26. The lower bracket 61 is adapted to be bolted to a cradle member 62. The bracket 61 has a lower attaching flange, as shown in Figs. 8 and 9, integral with a U-shaped upwardly directed body 63. Between the lower bracket and the fastening lever is a gear housing 64 provided with a worm and worm gears similar to those described above. The connection of the fastening lever with the upper gear wheel is similar to that previously described, but in this case both of the worm gears have the form shown in Fig. 10, the gear being provided with integral outstanding trunnions 65 adapted to be projected through holes in the associated member and riveted over, as indicated at 66. One of the gear wheels is shown in Fig. 10 by way of example, and in this form the gear teeth are provided in a depressed portion or channel 67, the sides of the depression or channel being chamfered or beveled as shown.

In this form there is no stop for limiting the approaching movement of the upper structural member 56 toward the lower member 62. The structure is designed so that when the boat is placed in position on the cradle the substantially upright fastening lever 60 will have its hooked upper end located slightly above the bracket lug 58, fastening of the boat in position and the release of the same being obtained by rotating the gears in the manner previously described.

The form shown in the drawings are by way of example only, and various modifications and changes in the details may be made without departure from the principles of the invention and the scope of the claims.

What I claim is:

1. A fastener such as described, comprising separate bracket members applicable respectively to upper and lower approachable wall elements, the upper bracket member being in the nature of a keeper and the lower bracket member being in the nature of a base for the fastener, a gear housing member containing upper and lower worm wheels and between said wheels a worm to be rotated by a key inserted into said housing, and a movable fastener member to cooperate with said upper bracket member by locking it relatively to said housing member, the respective worm wheels being eccentrically and pivotally connected to said fastener member and said lower bracket member.

2. A structure as defined in claim 1, in which said gear housing member has sides of substantially elliptical shape and through transverse bores accommodating the respective worm wheels and in which said worm has its axis at right angles to a plane passing through the gear wheel axes and is received in a space or chamber open at the respective sides of said housing member.

3. A structure as defined in claim 1, in which said bracket members are provided with cooperating stop means to limit the approach of one wall element toward the other.

4. A structure as defined in claim 1, in which the upper bracket member has at its lower part an outstanding lug to be engaged by said fastener member and in which the lower bracket member is connected to the lower worm wheel by an upstanding U-shaped part on said lower bracket member.

5. A fastener such as described, comprising a gear housing having parallel elongated side faces and provided with through upper and lower bores interconnected by a narrower chamber, said bores and chamber being open at said side faces, gearing in said housing comprising worm wheels in the respective bores and a wheel-driving worm in said chamber accessible for operation from the front of said housing, pivot members for connecting said respective wheels eccentrically and pivotally to an attaching plate and a swingable keeper-engaging fastener element, and an attaching plate and a swingable fastener element respectively connected to said wheels by said pivot members, said pivot members having a position in which they are in relative proximity to each other for making said fastener element positionally operative, and another position in which they are placed more remotely from each other for making said fastener element inoperative.

6. A fastener such as described, comprising parallel worm wheels with an interposed driving worm, a movable gear housing containing said worm wheels and worm, pivot members eccentrically mounted with the respective wheels which as the worm is rotated are moved relative one another, and fastener elements pivotally connected to the respective wheels by said pivot members, one of said fastener elements being a mounting member and the other being a keeper-engaging member.

7. A fastener such as described, comprising first and second means individually applicable to first and second approachable elements to be fastened with respect to one another, the first means being in the nature of a keeper and the second means being in the nature of a base for the fastener, a gear housing member containing upper and lower worm wheels and a worm positioned between said wheels to be rotated by a key inserted into said housing, and a movable fastener member to cooperate with said first means by locking it relative to said housing member, the respective worm wheels being eccentrically and pivotally connected to said fastener member and said second means.

References Cited in the file of this patent

UNITED STATES PATENTS

| | | |
|---|---|---|
| 313,888 | Schroder | Mar. 17, 1885 |
| 1,060,189 | Jones | Apr. 29, 1913 |
| 1,438,757 | Goddard | Dec. 12, 1922 |
| 2,036,151 | Lang | Mar. 31, 1936 |
| 2,328,003 | Gardes | Aug. 31, 1943 |
| 2,786,596 | Claud-Mantle | Mar. 26, 1957 |